US012611592B2

(12) United States Patent
Su et al.

(10) Patent No.: US 12,611,592 B2
(45) Date of Patent: Apr. 28, 2026

(54) HAND TRAINING METHOD WITH FORCE FEEDBACK AND HAND TRAINING DEVICE

(71) Applicant: National Cheng Kung University, Tainan (TW)

(72) Inventors: Fong-Chin Su, Tainan (TW); Li-Chieh Kuo, Tainan (TW); Hsiao-Feng Chieh, Tainan (TW); Chien-Ju Lin, Tainan (TW); Hsiu-Yun Hsu, Tainan (TW)

(73) Assignee: National Cheng Kung University, Tainan (TW)

( * ) Notice: Subject to any disclaimer, the term of this patent is extended or adjusted under 35 U.S.C. 154(b) by 264 days.

(21) Appl. No.: 18/370,431

(22) Filed: Sep. 20, 2023

(65) Prior Publication Data

US 2024/0091635 A1 Mar. 21, 2024

Related U.S. Application Data

(60) Provisional application No. 63/376,441, filed on Sep. 21, 2022.

(51) Int. Cl.
*A63F 13/24* (2014.01)
*A63B 21/00* (2006.01)
(Continued)

(52) U.S. Cl.
CPC .......... *A63F 13/24* (2014.09); *A63B 21/4019* (2015.10); *A63B 21/4035* (2015.10); *A63B 23/16* (2013.01); *A63F 13/218* (2014.09); *A63F 13/22* (2014.09); *A63F 13/285* (2014.09); *G06F 3/016* (2013.01)

(58) Field of Classification Search
CPC ........ A63F 13/24; A63F 13/218; A63F 13/22;

A63F 13/285; A63B 21/4019; A63B 21/4035; A63B 23/16; A63B 21/0552; A63B 21/0557; A63B 21/4043; A63B 2071/0644; A63B 2220/51;
(Continued)

(56) References Cited

U.S. PATENT DOCUMENTS 4,791,408 A * 12/1988 Heusinkveld ......... G06F 3/0235
700/84
5,841,425 A * 11/1998 Zenz, Sr. ................ G06F 3/038
345/158
(Continued)

OTHER PUBLICATIONS

Cong Peng et al., A Visuo-Haptic Attention Training Game With Dynamic Adjustment of Difficulty, Special Section On Smart Health Sensing and Computational Intelligence: From Big Data To Big Impacts, 2019 IEEE Translations and content mining are permitted for academic research, vol. 7.
(Continued)

*Primary Examiner* — Carl V Larsen
(74) *Attorney, Agent, or Firm* — Troutman Pepper Locke LLP; Tim Tingkang Xia, Esq.

(57) ABSTRACT

The present invention discloses a force feedback hand training method including: providing a training game content and adjusting the training game content based on predetermined parameters; displaying the training game content on a display; determining whether an input button position of at least one input signal from a hand training device matches a predetermined input button position; and storing a determination result in a storage module.

17 Claims, 7 Drawing Sheets

(51) Int. Cl.

| | |
|---|---|
| *A63B 23/16* | (2006.01) |
| *A63F 13/218* | (2014.01) |
| *A63F 13/22* | (2014.01) |
| *A63F 13/285* | (2014.01) |
| *G06F 3/01* | (2006.01) |

(58) Field of Classification Search

CPC ........ A63B 2220/806; A63B 2220/807; G06F 3/016; G06F 3/011

See application file for complete search history.

(56) References Cited

U.S. PATENT DOCUMENTS

| | | | | |
|---|---|---|---|---|
| 6,545,667 | B1 * | 4/2003 | Lilenfield | G06F 3/03549 |
| | | | | 345/157 |
| 6,765,502 | B2 * | 7/2004 | Boldy | G06F 3/021 |
| | | | | 400/489 |
| 7,006,075 | B1 * | 2/2006 | Olson | G06F 3/03543 |
| | | | | 345/163 |
| 7,113,171 | B2 * | 9/2006 | Vayda | G06F 3/0219 |
| | | | | 345/169 |
| 10,475,352 | B2 * | 11/2019 | Cramer | A63B 23/14 |
| 10,599,233 | B1 * | 3/2020 | Amalou | G06F 3/0346 |
| D922,384 | S * | 6/2021 | Amalou | D14/409 |
| 2001/0008848 | A1 * | 7/2001 | Armstrong | G06F 3/0485 |
| | | | | 463/36 |
| 2002/0006827 | A1 * | 1/2002 | Ogata | A63F 13/533 |
| | | | | 463/43 |
| 2003/0083131 | A1 * | 5/2003 | Armstrong | A63F 13/218 |
| | | | | 463/37 |
| 2005/0083297 | A1 * | 4/2005 | Duncan | A63F 13/22 |
| | | | | 345/156 |
| 2005/0092083 | A1 * | 5/2005 | Baratz | A61B 5/224 |
| | | | | 73/379.02 |
| 2006/0274044 | A1 * | 12/2006 | Gikandi | G06F 3/03543 |
| | | | | 345/163 |
| 2009/0318269 | A1 * | 12/2009 | D'Addario | A63B 21/023 |
| | | | | 482/49 |
| 2013/0143718 | A1 * | 6/2013 | Pani | A63B 21/4035 |
| | | | | 482/8 |
| 2013/0196825 | A1 * | 8/2013 | Silagy | A63B 21/023 |
| | | | | 482/49 |
| 2013/0288777 | A1 | 10/2013 | Short et al. | |
| 2015/0190675 | A1 * | 7/2015 | Silagy | A63B 21/05 |
| | | | | 482/49 |
| 2016/0038075 | A1 | 2/2016 | Burdea et al. | |
| 2017/0069223 | A1 * | 3/2017 | Cramer | A63F 13/218 |
| 2021/0050163 | A1 * | 2/2021 | Guerrero, Jr. | A63F 13/24 |
| 2021/0110591 | A1 | 4/2021 | Yokokawa | |
| 2021/0126634 | A1 * | 4/2021 | Lee | G01L 17/00 |
| 2021/0162259 | A1 * | 6/2021 | D'Addario | A63B 21/05 |
| 2021/0357042 | A1 * | 11/2021 | Borodin | G06F 3/016 |
| 2023/0041782 | A1 * | 2/2023 | Nishioka | A61B 5/743 |
| 2023/0094151 | A1 * | 3/2023 | Seymour | A63B 23/16 |
| | | | | 482/8 |
| 2023/0113699 | A1 * | 4/2023 | Feuerstein | G16H 20/70 |
| | | | | 600/300 |
| 2024/0082698 | A1 * | 3/2024 | Duncan | A63F 13/22 |
| 2024/0169853 | A1 * | 5/2024 | Nath | G09B 19/00 |
| 2024/0207668 | A1 * | 6/2024 | Neely | A63B 21/4019 |
| 2024/0299795 | A1 * | 9/2024 | Bluman | A63B 21/4019 |

OTHER PUBLICATIONS

Jia Yu et al., Mobile VR Game Design for Stroke Rehabilitation, Springer International Publishing AG, part of Springer Nature 2018, P.-L. P. Rau (Ed.): CCD 2018, LNCS 10912, pp. 95-116, 2018.

* cited by examiner

100

17    13
15
14
12
16

A-A

1

13    12
17
15  14    11    16

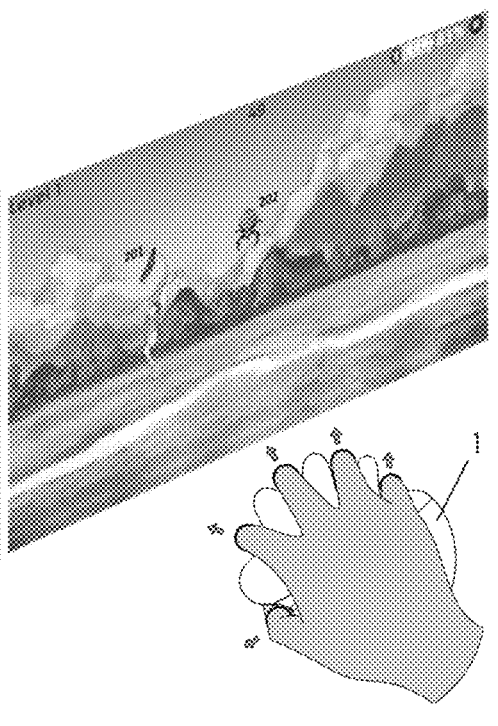

FIG. 6B

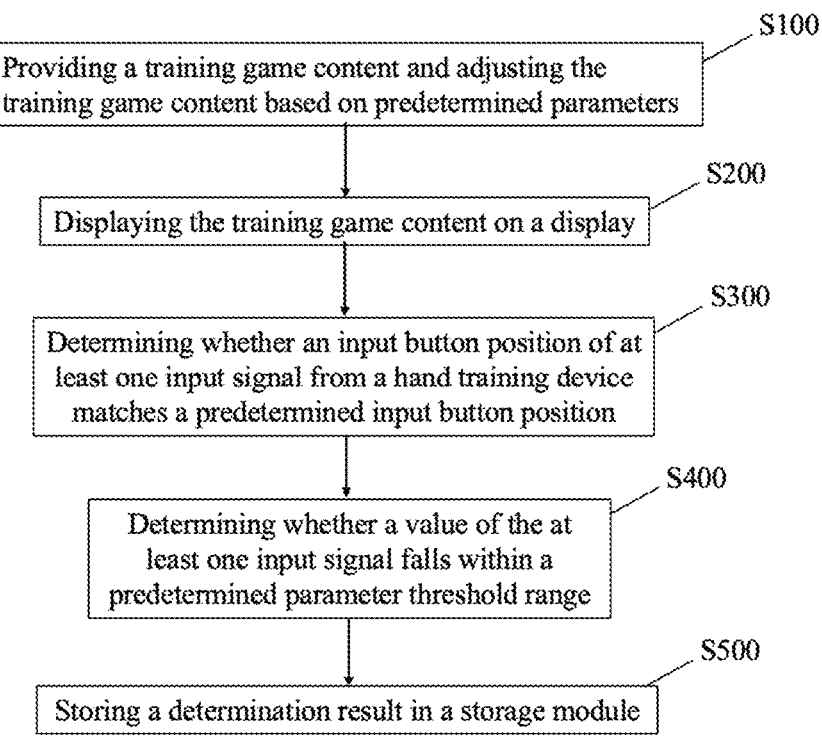

Providing a training game content and adjusting the training game content based on predetermined parameters — S100

Displaying the training game content on a display — S200

Determining whether an input button position of at least one input signal from a hand training device matches a predetermined input button position — S300

Determining whether a value of the at least one input signal falls within a predetermined parameter threshold range — S400

Storing a determination result in a storage module — S500

FIG. 7

HAND TRAINING METHOD WITH FORCE FEEDBACK AND HAND TRAINING DEVICE

CROSS REFERENCE

This non-provisional application claims benefit of American Provisional Application No. 63/376,441, filed on Sep. 21, 2022, the contents thereof are incorporated by reference herein.

FIELD OF THE INVENTION

This invention relates to the field of hand rehabilitation training, in particular, to a hand training method, a hand training device and a hand training system that utilizes force feedback to train patients.

BACKGROUND OF THE INVENTION

The average lifespan of the population is increasing year by year. As people age, the dexterity of the limbs tends to decline. However, there are many situations in daily life that require the use of both hands. Therefore, when the hands are unable to function properly, it can have a significant impact on daily life.

In addition, in recent years, the number of people suffering from cerebrovascular disease has been increasing. Cerebrovascular diseases are a general term for conditions that result in brain tissue damage due to poor intracranial blood circulation. Patients with acute cerebrovascular diseases, also known as strokes, often experience complications and sequelae such as hemiplegia, language disorders, and swallowing difficulties, with over half of stroke patients experiencing impaired hand movements. Therefore, cerebrovascular diseases also significantly affect the dexterity of patients' hands.

For patients experiencing a decline in hand function, from clinical point of view, the most effective method to improve hand function is functional strength training, also known as task-oriented training. This training not only helps to build strength but also enhances the coordination of hand movements, thereby improving hand function. Given the increasing elderly population in Taiwan and the rising proportion of individuals suffering from cerebrovascular diseases, coupled with a decreasing age of onset for these conditions, there is a significant need for a user-friendly hand rehabilitation training system.

SUMMARY OF THE INVENTION

In one embodiment of the present disclosure provides a force feedback hand training method, including: providing a training game content and adjusting the training game content based on predetermined parameters; displaying the training game content on a display; determining whether an input button position of at least one input signal from a hand training device matches a predetermined input button position; and storing a determination result in a storage module.

Preferably, the force feedback hand training method further includes: determining whether a value of the at least one input signal falls within a predetermined parameter threshold range.

Preferably, the force feedback hand training method of claim 1, further includes: determining whether the determination result matches a predetermined error pattern; adjusting the parameters according to a parameter setting corresponding to the error pattern.

In another embodiment of the present disclosure provides a hand training device, including: a bottom surface; a top surface connecting to the bottom surface; a plurality of buttons, wherein the plurality of buttons are configured on one side of a connecting portion of the top surface and the bottom surface, and are spaced apart from each other; a plurality of pressure sensors, wherein each pressure sensor respectively corresponds to the button; and a signal transmitter configured to transmit signals generated by the pressure sensors.

Preferably, the top surface protrudes in an arc shape along a normal direction of the bottom surface.

Preferably, a moving direction of the button is parallel to the bottom surface.

Preferably, the hand training device further includes a plurality of guiding portions configured on the connecting portion of the bottom surface and the top surface, wherein the guiding portions are spaced apart from the buttons.

Preferably, the guiding portions are arc-shaped and extend in a direction opposite to the bottom surface.

Preferably, a distance between a top of the guiding portion and the bottom surface is greater than a distance between a top of the button and the bottom surface.

Preferably, the two guiding portions connect to each other, and a connection part of the guiding portions is arc-shaped, with a normal vector direction opposite to a normal vector direction of the guiding portions.

Preferably, the button further includes a fixing portion configured on a side of the button opposite to the pressure sensor.

Preferably, the button further comprises a button extension portion connecting the pressure sensor, when the button moves along the direction parallel to the bottom surface, the button extension portion triggers the pressure sensor.

Preferably, the hand training device further includes a fixing portion, a pivot and the angle sensor, wherein the pivot connects the fixing portion and the angle sensor, when the fixing portion moves along a direction parallel to the bottom surface, the pivot rotates along a direction normal to the bottom surface.

Preferably, the hand training device further includes a displacement sensor configured to sense displacement of the hand training device.

Preferably, the hand training device further includes a vibrator.

In another embodiment of the present disclosure provides a hand training system, includes: a hand training device configured to collect input signals; a human-machine interface connecting to the hand training device, wherein the human-machine interface includes: a gaming module including a display, a training content processor and a memory wherein the training content processor is configured to read a training game content stored in the memory, adjust the training game content according to predetermined parameters and displays the training game content on the display; a determination module connecting to the gaming module, wherein the determination module is configured to determine whether an input button position of the input signal matches a predetermined position and determine whether a value of the input signal falls within a parameter threshold range; and a storage module configured store a determination result.

Preferably, the training game content comprises at least one control object and at least one target object, and a distance between the control object and the target object is adjusted based on the predetermined parameters.

Preferably, the hand training system further includes an augmented reality module, and the augmented reality module comprises a camera configured to capture a user's hand image and an image processor configured to combine the user's hand image with the training game content in an augmented reality manner and displays it on the display.

Preferably, the hand training device further includes a displacement sensor configured to sense displacement of the hand training device.

Preferably, the hand training device further includes a vibrator.

The hand training system provided by this disclosure allows users to view the training content on the display while inputting the corresponding signals (e.g., pressure signals) by the input device. Through interactive training based on user feedback signals, the users' hand functionality and flexibility can be improved, thereby stimulating brain functions and cognitive abilities.

BRIEF DESCRIPTION OF THE DRAWINGS

FIG. 6B is a schematic diagram of a user operating the input device with a training game content in one embodiment of the present disclosure.

FIG. 7 is a flowchart of the hand training method in one embodiment of the present disclosure.

DETAILED DESCRIPTION OF THE INVENTION

In order to make the aforementioned and/or other purposes, benefits, and features of the present disclosure clearer and more understandable, the following detailed description is provided, using preferred embodiments as examples.

Figure 1:
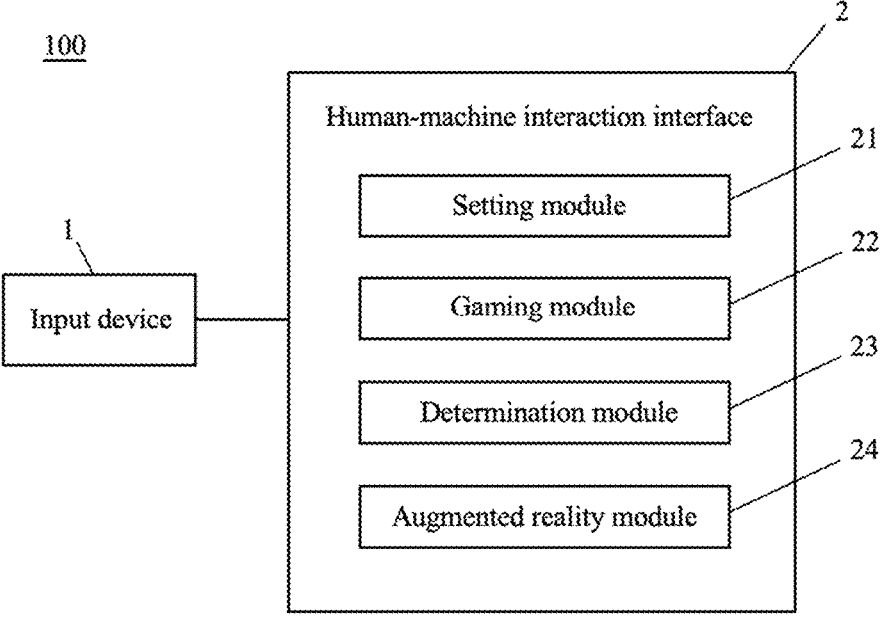
FIG. 1 is a schematic diagram of the hand training system in one embodiment of the present disclosure.

Please refer to FIG. 1. FIG. 1 is a schematic diagram of the hand training system in one embodiment of the present disclosure. The hand training system 100 includes an input device 1 and a human-machine interaction interface 2. The input device 1 includes at least one sensor configured to collect user input signals, and these user input signals are transmitted to the human-machine interaction interface 2 through a signal transmitter. Preferably, the sensors on the input device 1 may be pressure sensors configured to detect the input pressure or displacement sensors configured to detect the displacement, the present disclosure is not limited to these specific sensors.

The human-machine interaction interface 2 includes a setting module 21. Operators can use the setting module 21 to set the training parameters of the hand training system 100. In one embodiment of the present disclosure, the parameters may include the threshold for input pressure, the location where target objects appear, the timing of the appearance of target objects, the frequency the appearance of target objects, the number of target objects, the location where obstacles appear, the timing of the appearance of obstacles, the frequency of the appearance of obstacles, the number of obstacles, total training time, acceptable error range, and so on. The present disclosure is not limited to these parameters. It should be noted that the positions where target objects and obstacles appear will correspond to the button positions on the input device 1. For example, if the operator sets the location of a target object to appear at the leftmost position on the display, it means that the user needs to correspondingly press the leftmost button on the input device 1 (i.e., with the thumb of right hand), or if the operator sets the target object to appear in the center of the display, it means that the user must correspondingly press the button in the center of the input device 1 (i.e., with the middle finger of right hand), and so on.

The human-machine interaction interface 2 also includes a gaming module 22, which includes a display, a training content processor, and a memory. The training content processor is configured to read the training game content stored in the memory and adjust the training game content according to the parameters set by the operator in the setting module 21. The training content processor then displays the training game content on the display, such that the user can operate the input device 1 in response to the displayed content on the display.

The human-machine interaction interface 2 includes a determination module 23 configured to evaluate signals received from the input device 1. When the receiver of the determination module 23 receives signals from the input device 1, the determination module 23 determines whether the location of the input signal matches the position set by the operator in the setting module 21. Subsequently, the determination module 23 determines whether the value of the input signal falls within the parameter threshold range or within an acceptable error range set by the operator in setting module 21. The determination results are stored in a storage module, and after the training session is completed, the operator can retrieve the stored determination results to assess the user's training progress and adjust the parameters in the setting module 21 for future training sessions.

Figure 2:
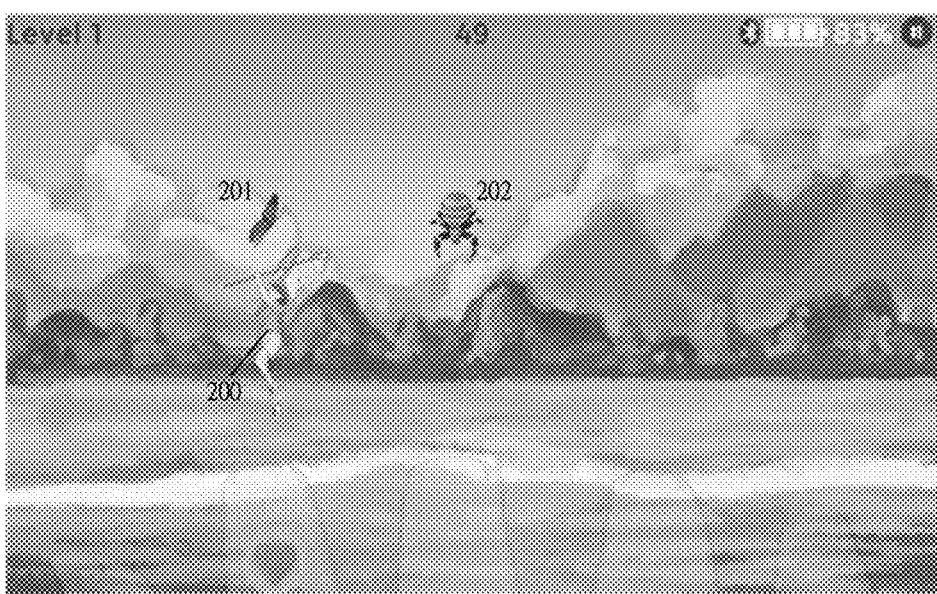
FIG. 2 is an image of the training game content in one embodiment of the present disclosure.

For example, please refer to FIG. 2, FIG. 2 is an image of the training game content in one embodiment of the present disclosure. Operators can use the setting module 21 to set the parameters for the appearance of the target object 201 (e.g., a butterfly shown in FIG. 2), including its timing, location, and the required input pressure threshold range for the user. When the settings are configured, the appearance time and position of the target object 201 in the training game content will correspondingly change. For instance, if the operator sets a higher-pressure threshold, the target object 201 will appear higher on the display, and further away from the control object 200. This indicates to the user that a greater input force is needed. Based on this information, users can press the corresponding button on the input device 1 with varying levels of force according to what is displayed on the display, thus facilitating the training sessions.

In one embodiment of the present disclosure, when the target object 201 appears on the display, the user can press the corresponding button on the input device 1. If the pressure value applied by the user falls within the parameter threshold range set by the operator in the setting module 21 or within the acceptable error range, the training game image will display the control object 200 successfully capturing the target object 201. The determination module 23 determines the user's input as successful and records the determination result in the storage module. On the other hand, if the pressure value applied by the user does not fall within the parameter threshold range set by the operator in the setting module 21 and does not fall within the acceptable error range, the training game image will show that the control object 200 does not capture the target object 201. In this case, the determination module 23 determines the user's input as unsuccessful and records the determination result in the storage module. Preferably, when the user presses the buttons with their fingers, the determination module 23 can also evaluate the coordination of the user's fingers based on the duration of the press and the synchronization of finger movements. If the user's coordination does not meet a predetermined standard, the determination module 23 will determine the user's input as unsuccessful and record the determination result in the storage module.

In another embodiment of the present disclosure, operators can set the location and timing of obstacles 202 (e.g., spiders shown in FIG. 2) in the setting module 21. For example, if the user presses the corresponding button on the input device 1 at the moment when the obstacle 202 appears, the determination module 23 will determine the user's input as unsuccessful and record the result in the storage module.

Through the configuration of target objects 201 and obstacles 202, the hand training system can effectively target the individual finger of the user, providing a more customized and comprehensive hand rehabilitation experience.

In another embodiment of the present disclosure, the determination module 23 of the human-machine interaction interface 2 is connected to the setting module 21. When the determination module 23 identifies that the determination results in the storage module match a pre-stored error pattern in the database, the controller within the determination module 23 automatically adjusts the parameters for the next training session, based on the parameter settings corresponding to that error pattern in the database through the setting module 22. This automatic adjustment is designed to target the portions where the user has performed poorly. For example, in a scenario that there is only one target object 201 displayed on the display, if the user simultaneously presses more than two buttons, the determination module 23 will determine that the user's finger independence needs to be improved. Consequently, the determination module 23 will automatically adjust the quantity and positioning of the target objects 201 and obstacles 202 in the next training session. On the other hand, if the target object 201 appears, the user presses the corresponding button, but the pressure value applied does not fall within the parameter threshold range or within the acceptable error range, the determination module 23 will determine that the user's finger strength control needs to be improved. The determination module 23 will automatically increase the target pressure threshold range and the allowable error range for the next training session.

The human-machine interaction interface 2 may also include an augmented reality module 24. The augmented reality module 24 includes a camera and an image processor. The camera is used to capture the user's hand image. The image processor is connected to the gaming module 22 and is configured to combine the user's hand image captured by the camera with the training game content in an augmented reality manner and displays it on the display. Such that users can simultaneously watch the training game content with their hand image on the display in order to enhance the effectiveness of the training.

Figure 3:
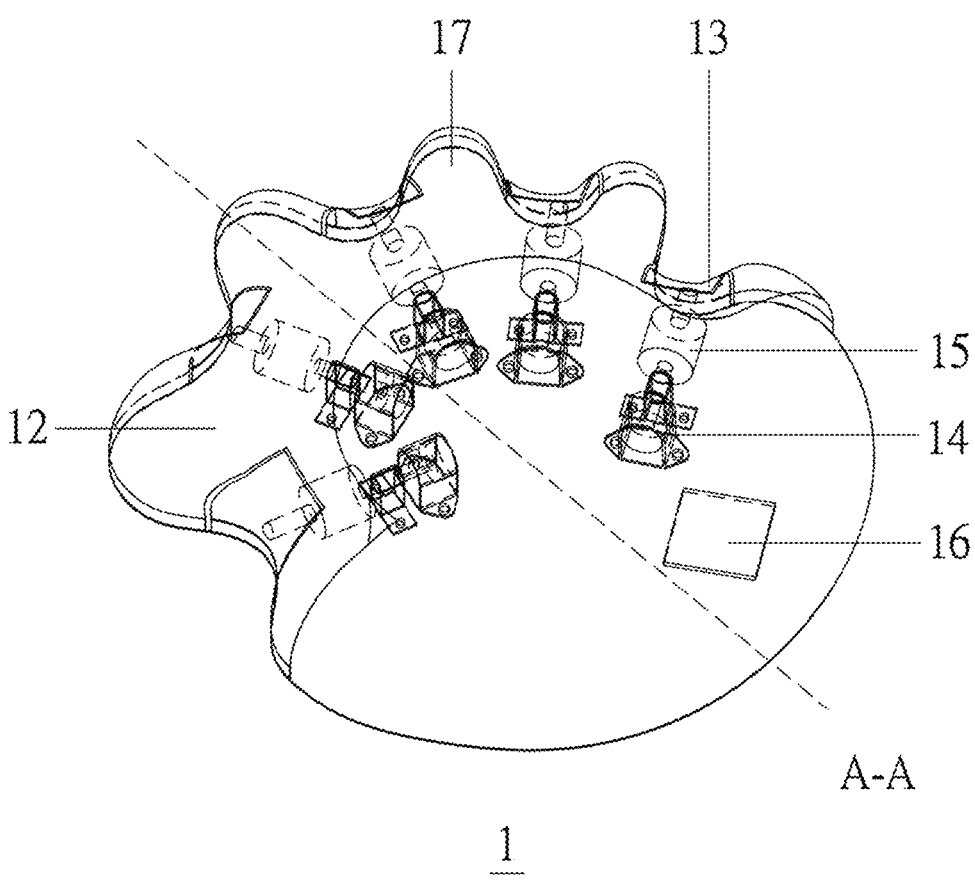
FIG. 3 is a schematic diagram of the input device in one embodiment of the present disclosure.
Figure 4:
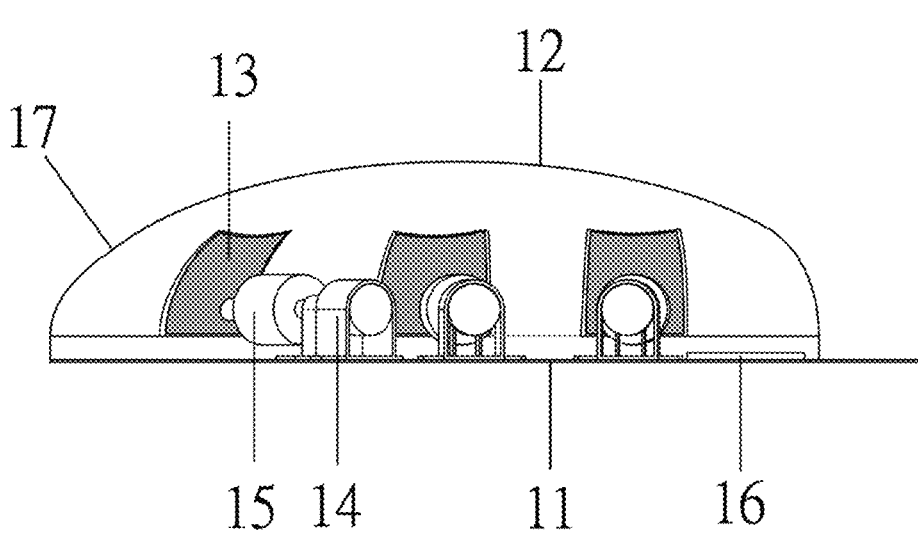
FIG. 4 is a cross-sectional view of the input device along the A-A plane within FIG. 3.

Please refer to FIG. 3 and FIG. 4. FIG. 3 is a schematic diagram of the input device in one embodiment of the present disclosure, and FIG. 4 is a cross-sectional view of the input device along the A-A plane within FIG. 3. The input device 1 has a bottom surface 11 and a top surface 12. The top surface 12 is connected to the bottom surface 11. The top surface 12 protrudes in an arc shape in a direction opposite to the bottom surface 11 along the normal direction of the bottom surface 11, creating an accommodating space between the top surface 12 and the bottom surface 11. In practical, the input device 1 serves as a hand training device, and the arc-shaped top surface 12 of the input device 1 provides a comfortable place for users to place their palms, facilitating user operation with the input device 1.

Multiple buttons 13 are configured on one side of the connecting portion of the top surface 12 and the bottom surface 11, and the multiple buttons are spaced apart from each other. Specifically, the positions where the multiple buttons 13 are set are suitable for the users to place their fingers to facilitate pressing. Multiple pressure sensors 14 are installed on the bottom surface 11 and are located within the accommodating space formed by the top surface 12 and the bottom surface 11. Each pressure sensor 14 respectively corresponds to one button 13. The buttons 13 have button extension portions 15 extending towards the accommodating space and connecting to the pressure sensors 14. The input device 1 also includes a signal transmitter 16, which electrically connects to the multiple pressure sensors 14 and is used to transmit signals to the human-machine interaction interface 2. When the user presses a button 13, the button 13 moves toward the accommodating space in a direction parallel to the bottom surface 11. The button extension portion 15 triggers the pressure sensor 14 to generate a pressure signal. The signal transmitter 16 then transmits the generated pressure signal to the receiver in the determination module 23. The pressure signal contains information about the location of the triggered button, allowing the determination module 23 to determine which button was pressed. For example, if the user presses a button 13 with their thumb and triggers the corresponding pressure sensor 14 to generate a pressure signal, this pressure signal will contain information about the location that indicates the position of the thumb. When the receiver in the determination module 23 receives this pressure signal, the determination module 23 can identify that the pressed button corresponds to the thumb of the user.

It is noted that, in the state where the moving direction of the buttons 13 is parallel to the bottom surface 11, when the user holds the input device 1, the user's palm will be in an arched shape, and the fingers bend toward the palm in a gripping posture. This configuration allows the gripping motion training more accurate. In another embodiment of the present disclosure, the moving direction of the buttons 13 can also be non-parallel to the bottom surface 11.

The input device 1 also includes multiple guiding portions 17, which are placed at the connecting portion of the bottom surface 11 and the top surface 12, on the same side as the buttons 13, and are spaced apart from the buttons 13. The guiding portions 17 are arc-shaped and connect to the top surface 12, extending in the direction opposite to the pressure sensors 14 and opposite to the bottom surface 11. The distance between the top of the guiding portions 17 and the bottom surface 11 is greater than the distance between the top of the buttons 13 and the bottom surface 11. The two guiding portions 17 on either side of the buttons 13 are connected to each other, and the connection between the guiding portions 17 is arc-shaped, with the normal vector direction opposite to that of the guiding portions 17. In practical, when the user holds the input device 1, the user can place their fingers along the connection between the two guiding portions, and the fingers can slide along the sides of the guiding portions 17 and press the buttons 13. The arc shape of the guiding portions 17 and the connection between the guiding portions are ergonomic, making the input device 1 more comfortable and convenient for users to press the buttons 13.

Figure 5A:
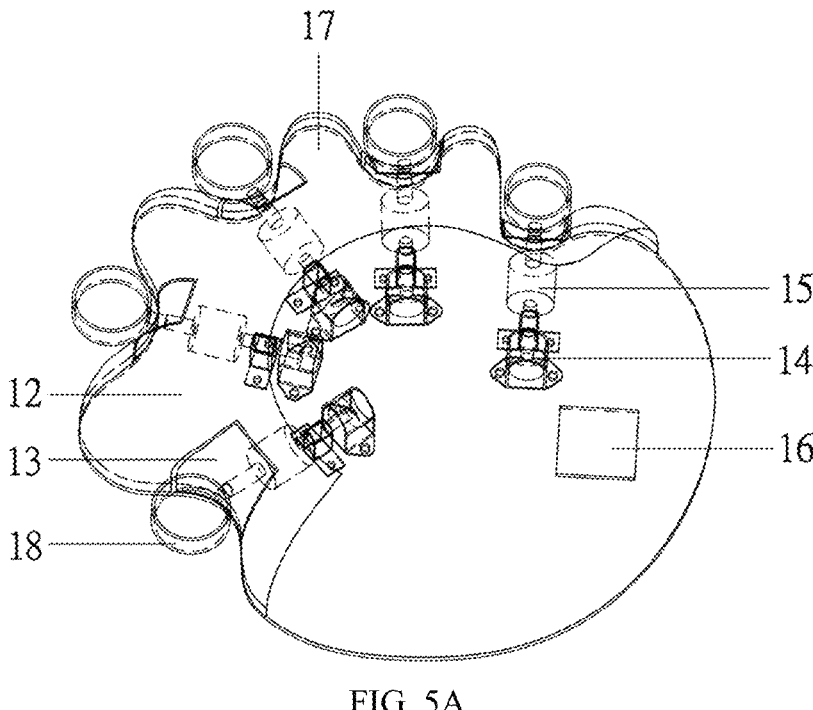
FIG. 5A is a schematic diagram of the input device in another embodiment of the present disclosure.
Figure 5B:
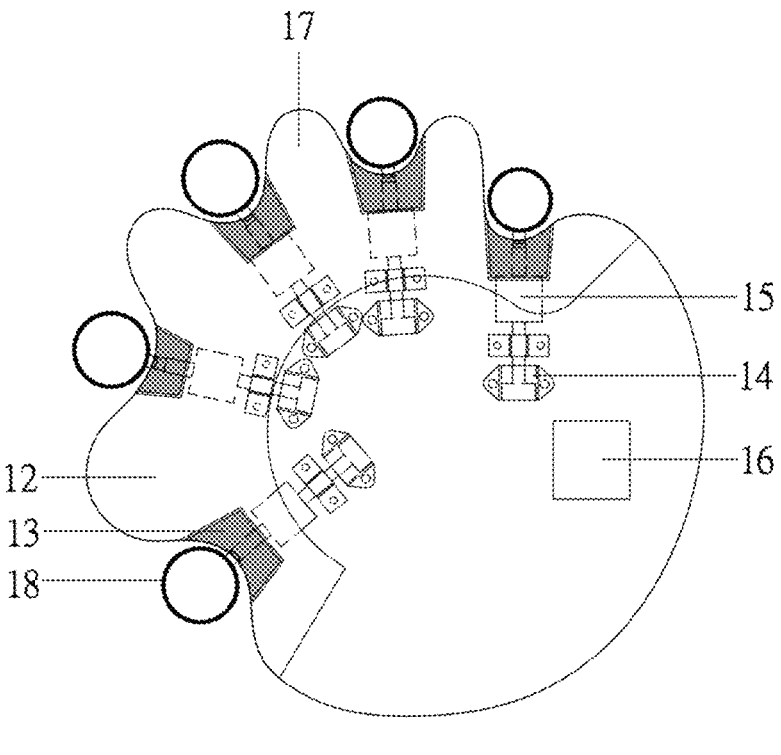
FIG. 5B is a top view of the input device in the embodiment shown in FIG. 5A.

In another embodiment of the present disclosure, as shown in FIG. 5A and FIG. 5B, the button 13 has a fixing portion 18. The fixing portion 18 is positioned on the side of the buttons 13 opposite to the pressure sensors 14. Preferably, the fixing portion 18 may have a ring structure with a hole, but the present disclosure is not limited to this, and the fixing portion 18 can be any structure that allows the user to press against with their fingers. In practical, the user can insert their fingers through the hole and press against the inner side of the fixing portion 18 with the outer side of the finger, in the direction opposite to the pressure sensors 14. The buttons 13 will move along the direction parallel to the bottom surface 11 and toward the opposite direction of the pressure sensors 14, causing the button extension part 15 to trigger the pressure sensors 14 generating tension signals. Such that the input device 1 may not only sense the pressing signals but also sense tension signals from the user's fingers, adding another dimension to the training.

Figure 5C:
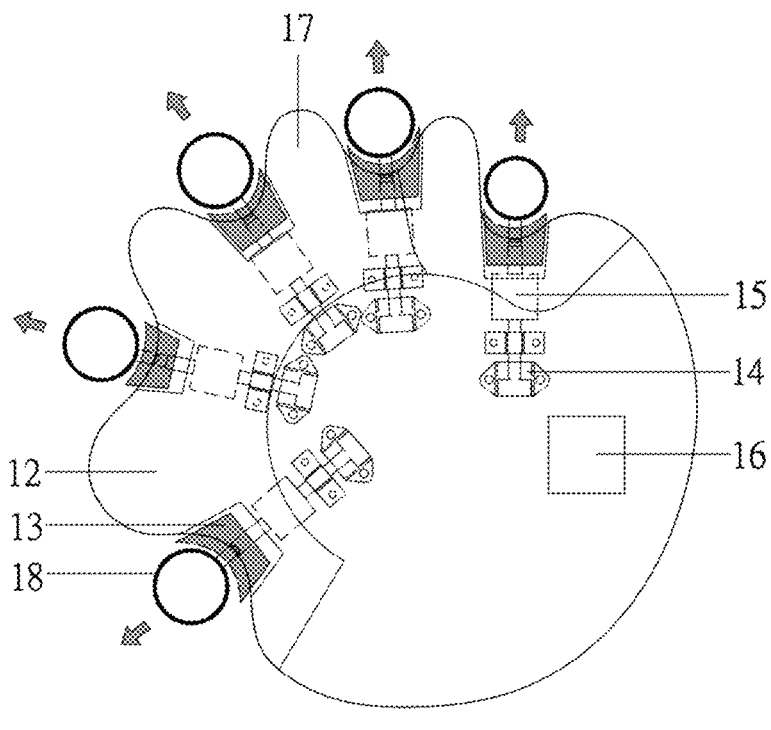
FIG. 5C is an operational schematic diagram of the embodiment shown in FIG. 5A.
Figure 5D:
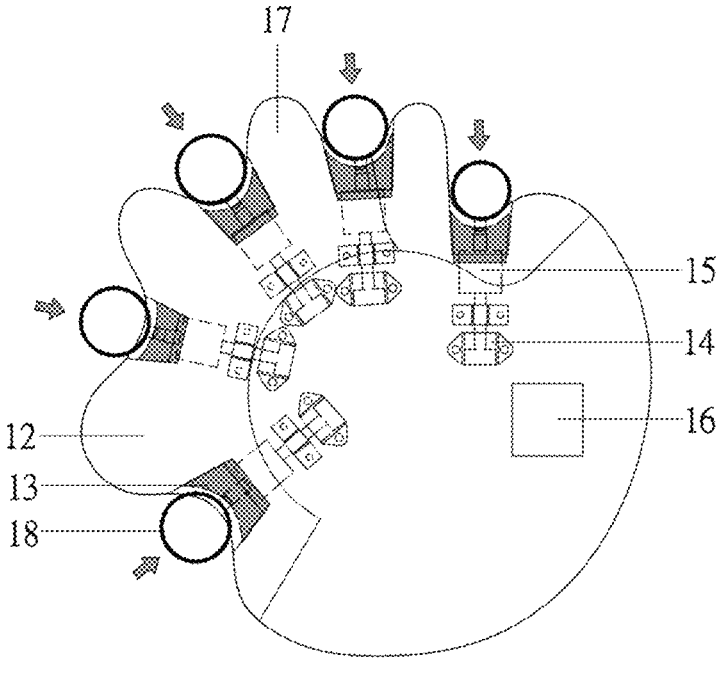
FIG. 5D is another operational schematic diagram of the embodiment shown in FIG. 5A.

In the description below, the training methods involving two different dimensions are explained. Please refer to FIG. 5C and FIG. 5D.

The input device 1 may include an elastic element that connects to the buttons 13 to facilitate the buttons return to the neutral position. The elastic element can be placed within the pressure sensors 14 or in other positions where it can provide elastic force to reset the buttons 13. The present disclosure is not limited to a specific location for the elastic element. The neutral position of the buttons 13, where no deformation of the elastic element has occurred, serves as a reference point. When the user's fingers press against the fixing portion 18, causing the buttons 13 to move in the direction opposite to the pressure sensors 14, the elastic element is stretched, resulting in positive displacement of the buttons 13, and the pressure sensors 14 generates tension signals. On the other hand, when the user's fingers press the buttons 13, the elastic element contracts, causing negative displacement of the buttons 13, and the pressure sensors 14 generates pressure signals.

Figure 5E:
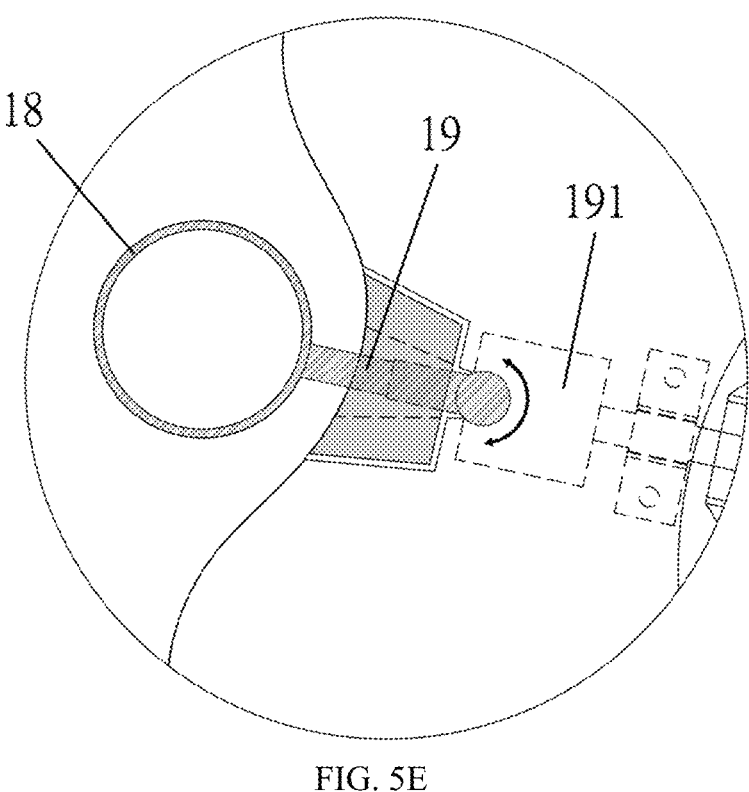
FIG. 5E is an enlarged view of a portion of the input device in another embodiment of the present disclosure.

In another embodiment of the present disclosure, the input device 1 may also sense signals related to the lateral movement of the user's fingers. Please refer to FIG. 5E, in this embodiment, the input device 1 includes a pivot 19 connecting the fixing portion 18 and the angle sensor 191. When in use, the user can insert their fingers through the fixing portion 18 and press against the sides of the fixing portion 18, causing the fixing portion 18 to pivot left or right around the pivot 19, and the pivot 19 rotates along a direction normal to the bottom surface. The angle sensor 191 is used to detect the angle of lateral movement of the user's fingers. Preferably, the direction of lateral movement is perpendicular (90 degrees) to the pressing direction of button. Such that the input device 1 can provide another training dimension.

Figure 6A:
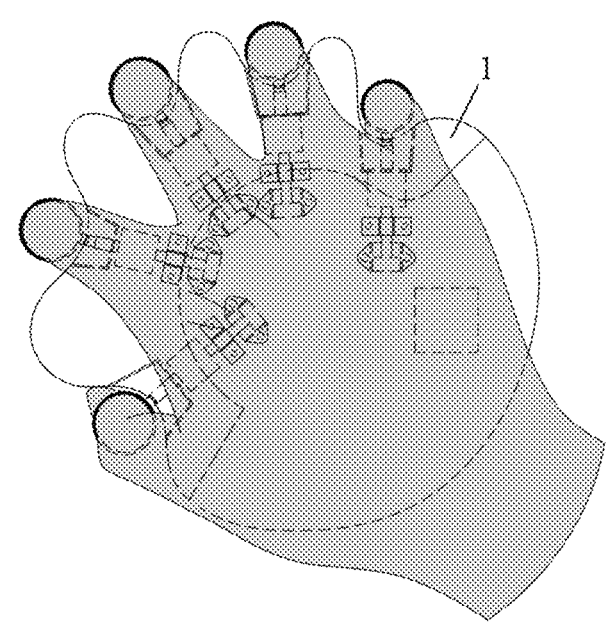
FIG. 6A is a schematic diagram of a user holding the input device in one embodiment of the present disclosure.

Please refer to FIG. 6A and FIG. 6B. When the user holds the input device 1 and places their fingers into the fixing portion 18. The operator can select the dual-dimensional training mode from the setting module 21 and input training parameters. For example, in the dual-dimensional training mode, the control object 200 may be positioned on the horizontal centerline of the display. The operator can set the target object 201 to appear above or below the controlled object 200, and the distance between the target object 201 and the control object 200 corresponds to the amount of tensile force or compressive force that the user needs to input.

When the target object 201 appears above the control object 200, the user needs to extend their fingers outward, causing the buttons 13 to produce a positive displacement, to make the pressure sensor 14 generates the tension signals. If the tensile force applied by the user's fingers falls within the parameter threshold range set by the operator or within the acceptable error range, the display will display the control object 200 capturing the target object 201. On the other hand, when the target object 201 appears below the control object 200, the user needs to contract their fingers inward and press the buttons 13, causing the buttons 13 to produce a negative displacement, to make the pressure sensors 14 generates pressure signals. If the compressive force applied by the user's fingers falls within the parameter threshold range set by the operator or within the acceptable error range, the display will display the control object 200 capturing the target object 201. The described dual-dimensional training mode of the present disclosure is not limited to the specific examples mentioned. As long as the positive and negative displacement of the buttons 13 can be used to control the moving direction of the control object 200, it falls within the scope of this disclosure.

In another embodiment of the present disclosure, the input device 1 may also include a displacement sensor configured to sense displacement. Thus, the hand training system 100 can train not only the user's fingers but also the upper arm and forearm of the user. Specifically, when the user holds the input device 1 and follows the guidance of the gaming module 22 to raise the hand to a specific height, the determination module 23 in the human-machine interaction interface 2 will determine whether the height at which the user raises the hand falls within the height threshold range set by the operator in the setting module 21 or within an allowable error range, so that the user's upper arm and forearm can be trained.

In another embodiment of the present disclosure, the input device 1 may also include a vibrator. When the determination module 23 determines that the value of the user's input signals do not fall within the parameter threshold range set by the operator in the setting module 21 and within an allowable error range, it can provide immediate feedback to the user through the vibrator.

Please refer to FIG. 7. FIG. 7 is a flowchart of the hand training method in one embodiment of the present disclosure. The hand training method provided by the present invention includes the following steps.

First, in step S100, the operator enters the training parameters through the setting module 21. The training content processor then adjusts the training game content based on these parameters. In step S200, the training content processor displays the training game content on the display of the gaming module 22, allowing the user to operate the input device 1 while watching the training game content on the display.

When the user presses the button 13 on the input device 1, the pressure sensor 14 is triggered to generate pressure signals. In another embodiment of the present disclosure, the user's fingers may push against the fixing portion 18, causing the button 13 to move in the direction opposite to the pressure sensors 14, and the pressure sensor 14 generates tension signals. In this embodiment, the determination module 23 of the human-machine interface 2 will determine whether the received signal matches the training parameters set by the operator. For example, if the operator requires the user to extend the fingers outward, but the human-machine interface 2 received a pressure signal, then the determination module 23 will determine an input error and record this result in the storage module.

Next, in step S300, the determination module 23 will determine whether the position of the input signal matches the input position set by the operator in the setting module 21. For example, the operator can set in the setting module 21 requiring the user to simultaneously flex or extend one or more fingers. Specifically, the operator can set the training parameters requiring that the user needs to press both of the buttons corresponding to the thumb and index finger positions on the input device 1 to simulate a pinching motion. In this case, the display will display two target objects 201 and two control objects 200, each appearing at the left side of the display where correspond to the user's thumb and index finger buttons. If the user presses the buttons corresponding to the thumb and index finger and trigger the pressure sensors 14, the determination module 23 will determine whether the button position of the input signal match the operator's settings. If one or both of the buttons corresponding to the thumb and index finger are not pressed, the determination module 23 will determine an input error and record this result in the storage module. It is noted that the thumb and index finger pressing is just one embodiment of the present disclosure, and the disclosure is not limited to this. In other embodiments, the operator can set in the setting module to require the user to flex or extend any one or multiple fingers for training.

In step S400, if the value of the input signal falls within the parameter threshold range and allowable error range set by the operator in the setting module 21, the determination module 23 determines a successful input by the user. The display will display the control object 200 capturing the target object 201, and, in step S500, the determination module 23 will record the determination result in the storage module. The operator can adjust the parameters for the next training session based on the recorded results in the storage module. Alternatively, the determination module 23 can automatically compare the user's error pattern with error patterns established in a database. If the user's error pattern matches one of the error patterns in the database, the determination module 23 will automatically modify the parameters corresponding to that error pattern through the setting module 21 to adjust the parameters for the next training session, such that parameters may be adjusted automatically.

Figure 8:
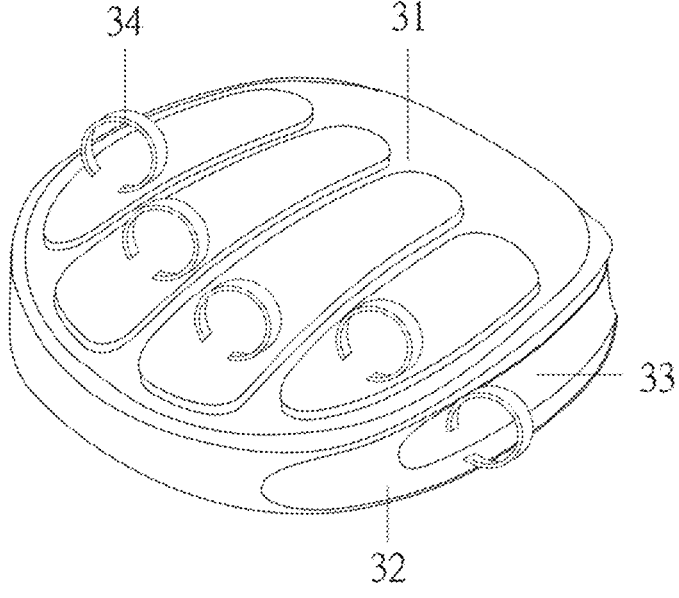
FIG. 8 is a schematic diagram of the input device in another embodiment of the present disclosure.

It is noted that in the hand training method of the present disclosure, the structure of the input device is not limited to the input device described previously. In another embodiment of the disclosure, as shown in FIG. 8, the input device can be in a planar manner. The input device may include a supporting portion 31 and a side portions 32, with the supporting portion 31 connected to the side portions 32. The input device also includes multiple buttons 33, with one button 33 set on the side portion 32 corresponding to the user's thumb, and the other multiple buttons 33 are configured on the supporting portion 31 and spaced apart from each other, corresponding to the user's other four fingers. Each of the button 33 may have a fixing portion 34. In practical, the user can place their palm on the supporting portion 31, with the thumb passing through the fixing portion of the button on the side portion 32 and the other four fingers passing through the fixed portions of the buttons on the supporting portion 31 and resting flat on the buttons.

Figure 9:
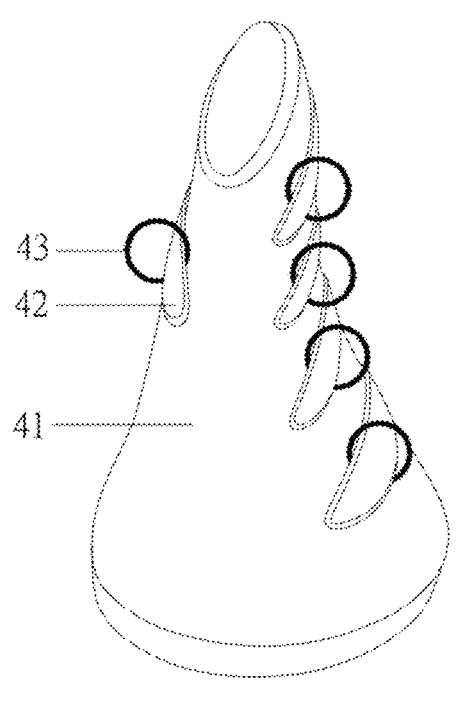
FIG. 9 is a schematic diagram of the input device in another embodiment of the present disclosure.

In another embodiment of the present disclosure, as shown in FIG. 9, the input device can be in vertical manner. The input device may include a gripping portion 41 and multiple buttons 42, with each button having a fixing portion 43. One button 42 is set on the first side of the gripping portion 41 corresponding to the user's thumb, and the other multiple buttons 42 are configured on the second side of the gripping portion 41 opposite to the first side. Those buttons are spaced apart from each other and correspond to the user's other four fingers. In practical, the user can pass their thumb through the fixing portion of the button on the first side and pass the other four fingers through the fixing portions of the buttons on the second side, allowing the hand to grasp the input device in an upright posture, thereby more accurately simulating the gripping posture in daily life.

It is noted that, in addition to the above-mentioned input device structures, the hand training method and hand training system of the present disclosure may also be used in conjunction with other input device structures and sensors to simulate more of hand movements for training purposes.

Through the hand training method, hand training device, and hand training system provided by the present disclosure, users can simultaneously look at the training game content on the display and input corresponding signals (e.g., pressure signals) using the input device. This interactive training method helps to improve the user's hand functionality and flexibility, stimulating brain and cognitive functions through user's feedback. The system is non-wearable meaning there is no need for additional mechanical devices (e.g., exoskeleton assistance devices) when using. This makes the system lightweight, convenient, and suitable for patients with various conditions. Furthermore, operators can set the training parameters by the setting module or allow the system to automatically adjust parameters based on the user's input errors, such that the training process can be automatic.

The above description represents only preferred embodiments of the present invention, and the scope of the present invention should not be limited to these embodiments. Therefore, any simple equivalent changes and modifications made according to the scope of the patent claims and the content of the invention disclosure are still within the scope of the present invention.

What is claimed is:

1. A force feedback hand training method, comprising:
   providing a training game content and adjusting the training game content based on predetermined parameters;
   displaying the training game content on a display;
   determining whether an input button position of at least one input signal from a hand training device matches a predetermined input button position; and
   storing a determination result in a storage module, wherein:
   the hand training device, comprising:
   a bottom surface;
   a top surface connecting to the bottom surface;

a plurality of buttons, wherein the plurality of buttons are configured on one side of a connecting portion of the top surface and the bottom surface, and are spaced apart from each other, wherein a moving direction of the button is parallel to the bottom surface;

a plurality of pressure sensors, wherein each pressure sensor respectively corresponds to the button;

a signal transmitter configured to transmit signals generated by the pressure sensors;

a fixing portion having a ring structure with a hole, wherein the fixing portion is configured on a side of the button opposite to the pressure sensor;

an angle sensor, wherein the angle sensor is configured on a side of the button same to the pressure sensor; and a pivot, wherein the pivot connects the fixing portion and the angle sensor, when the fixing portion moves along a direction parallel to the bottom surface, the pivot rotates along a direction normal to the bottom surface.

2. The force feedback hand training method of claim 1, further comprising:

determining whether a value of the at least one input signal falls within a predetermined parameter threshold range.

3. The force feedback hand training method of claim 1, further comprising:

determining whether the determination result matches a predetermined error pattern; and adjusting the parameters according to a parameter setting corresponding to the error pattern.

4. A hand training device, comprising:

a bottom surface;

a top surface connecting to the bottom surface;

a plurality of buttons, wherein the plurality of buttons are configured on one side of a connecting portion of the top surface and the bottom surface, and are spaced apart from each other, wherein a moving direction of the button is parallel to the bottom surface;

a plurality of pressure sensors, wherein each pressure sensor respectively corresponds to the button;

a signal transmitter configured to transmit signals generated by the pressure sensors;

a fixing portion having a ring structure with a hole, wherein the fixing portion is configured on a side of the button opposite to the pressure sensor;

an angle sensor, wherein the angle sensor is configured on a side of the button same to the pressure sensor; and a pivot, wherein the pivot connects the fixing portion and the angle sensor, when the fixing portion moves along a direction parallel to the bottom surface, the pivot rotates along a direction normal to the bottom surface.

5. The hand training device of claim 4, wherein the top surface protrudes in an arc shape along a normal direction of the bottom surface.

6. The hand training device of claim 4, wherein the hand training device further comprises a plurality of guiding portions configured on the connecting portion of the bottom surface and the top surface, and the guiding portions are spaced apart from the buttons.

7. The hand training device of claim 6, wherein the guiding portions are arc-shaped and extend in a direction opposite to the bottom surface.

8. The hand training device of claim 7, wherein a distance between a top of the guiding portion and the bottom surface is greater than a distance between a top of the button and the bottom surface.

9. The hand training device of claim 7, wherein the two guiding portions connect to each other, and a connection part of the guiding portions is arc-shaped, with a normal vector direction opposite to a normal vector direction of the guiding portions.

10. The hand training device of claim 4, wherein the button further comprises a button extension portion connecting the pressure sensor, when the button moves along a direction parallel to the bottom surface, the button extension portion triggers the pressure sensor.

11. The hand training device of claim 4, wherein the hand training device further comprises a displacement sensor configured to sense displacement of the hand training device.

12. The hand training device of claim 4, wherein the hand training device further comprises a vibrator.

13. A hand training system, comprising:

the hand training device of claim 4, configured to collect input signals;

a human-machine interface connecting to the hand training device, wherein the human-machine interface comprises:

a gaming module including a display, a training content processor and a memory wherein the training content processor is configured to read a training game content stored in the memory, adjust the training game content according to predetermined parameters and displays the training game content on the display;

a determination module connecting to the gaming module, wherein the determination module is configured to determine whether an input button position of the input signal matches a predetermined position and determine whether a value of the input signal falls within a parameter threshold range; and a storage module configured to store a determination result.

14. The hand training system of claim 13, wherein the training game content comprises at least one control object and at least one target object, and a distance between the control object and the target object is adjusted based on the predetermined parameters.

15. The hand training system of claim 13, wherein the hand training system further comprises an augmented reality module, and the augmented reality module comprises a camera configured to capture a user's hand image and an image processor configured to combine the user's hand image with the training game content in an augmented reality manner.

16. The hand training system of claim 13, wherein the hand training device further comprises a displacement sensor configured to sense displacement of the hand training device.

17. The hand training system of claim 13, wherein the hand training device further comprises a vibrator.

* * * * *